US012694723B2

(12) United States Patent
Nogami et al.

(10) Patent No.: US 12,694,723 B2
(45) Date of Patent: Jul. 28, 2026

(54) INFORMATION COLLECTION SYSTEM AND INFORMATION COLLECTION METHOD

(71) Applicant: HONDA MOTOR CO., LTD., Tokyo (JP)

(72) Inventors: Daiki Nogami, Tokyo (JP); Yuka Sameshima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 293 days.

(21) Appl. No.: 18/466,905

(22) Filed: Sep. 14, 2023

(65) Prior Publication Data

US 2024/0104970 A1 Mar. 28, 2024

(30) Foreign Application Priority Data

Sep. 28, 2022 (JP) ................................ 2022-155434

(51) Int. Cl.
*G07C 5/00* (2006.01)
*G07C 5/08* (2006.01)

(52) U.S. Cl.
CPC ........... *G07C 5/008* (2013.01); *G07C 5/0841* (2013.01)

(58) Field of Classification Search
None
See application file for complete search history.

(56) References Cited

U.S. PATENT DOCUMENTS

2018/0068510 A1* 3/2018 Atsumi .................. B60R 25/25
2019/0278588 A1* 9/2019 Miyake ................ B60R 16/023
2022/0035840 A1 2/2022 Nakayama

FOREIGN PATENT DOCUMENTS

JP 2013250999 A * 12/2013
JP 2018-136754 A 8/2018
WO 2020/115862 A1 6/2020
WO WO-2022054650 A1 * 3/2022 .............. G08G 1/00

OTHER PUBLICATIONS

Machine translation of WO 2020115862 A1 (Year: 2020).*
Machine translation of WO-2022054650-A1 (Year: 2022).*
Machine translation of JP-2013250999-A (Year: 2013).*
Japanese Office Action Corresponding to JP Patent Application No. 2022-155434, issued Jun. 4, 2024, 9 pages.

* cited by examiner

*Primary Examiner* — Anne Marie Antonucci
*Assistant Examiner* — Kyle S Park
(74) *Attorney, Agent, or Firm* — Rankin, Hill & Clark LLP

(57) ABSTRACT

An information collection system includes: a permitted utilization purpose list acquisition unit configured to acquire a permitted utilization purpose list indicating permitted utilization purposes for which a target user U permits provision of monitor information; a monitor information utilization purpose table generation unit configured to generate a monitor information utilization purpose table in which a kind of the monitor information and one of the plurality of utilization purposes are made to correspond, based on specifications of the target vehicle; and a transmission request kind list generation unit configured to generate a transmission request kind list indicating the kind of the monitor information for which transmission is to be requested from the target vehicle, based on the permitted utilization purpose list and the monitor information utilization purpose table.

7 Claims, 5 Drawing Sheets

FIG.2

111

| VEHICLE CODE | VEHICLE MODEL/ MODEL YEAR | USER INFORMATION | VEHICLE MAINTENANCE INFORMATION |
|---|---|---|---|
| Cc-001 | Md-001 | Ui-001 | Cm-001 |
| Cc-002 | Md-002 | Ui-002 | Cm-002 |
| Cc-003 | Md-003 | Ud-003 | Cm-003 |
| : | : | : | : |

Cri

FIG. 3

MuT

| VEHICLE MODEL: XX, MODEL YEAR: yyyy, SOFTWARE Ver: Ver.zz | | |
|---|---|---|
| UTILIZATION PURPOSE OF MONITOR INFORMATION | FUNCTION ID | MONITOR INFORMATION ID |
| REMOTE CONTROL SERVICE | FID-1.1 | MID-001, MID-002, MID-003 |
| | FID-1.2 | MID-002, MID-003, MID-005 |
| TRAFFIC INFORMATION SERVICE | FID-2.1 | MID-010, MID-011 |
| | FID-2.2 | MID-012, MID-015 |
| DRIVER FEEDBACK SERVICE | FID-3.1 | MID-020, MID-021, MID-023 |
| | FID-3.2 | MID-021, MID-025 |
| SECURITY SERVICE | FID-4.1 | MID-030, MID-031 |
| Wi-Fi Host Spot SERVICE | FID-5.1 | MID-002, MID-003 |

SpL

| UTILIZATION PURPOSE OF MONITOR INFORMATION | PERMISSION FROM USER |
|---|---|
| REMOTE CONTROL SERVICE | ON |
| TRAFFIC INFORMATION SERVICE | ON |
| DRIVER FEEDBACK SERVICE | OFF |
| SECURITY SERVICE | OFF |
| Wi-Fi Host Spot SERVICE | OFF |
| ALL SERVICES | OFF |

SrL

| TRANSMISSION REQUEST-MONITOR INFORMATION ID |
|---|
| MID-001 |
| MID-002 |
| MID-003 |
| MID-005 |
| MID-010 |
| MID-011 |
| MID-012 |
| MID-015 |

INFORMATION COLLECTION SYSTEM AND INFORMATION COLLECTION METHOD

INCORPORATION BY REFERENCE

The present application claims priority under 35 U.S.C. § 119 to Japanese Patent Application No. 2022-155434 filed on Sep. 28, 2022. The content of the application is incorporated herein by reference in its entirety.

BACKGROUND OF THE INVENTION

Field of the Invention

The present invention relates to an information collection system and an information collection method.

Description of the Related Art

Conventionally, for a large number of vehicles, a system has been known, which receives and collects various kinds of information indicating a use status and a travel status of a vehicle from the vehicles (for example, see Japanese Patent Laid-Open No. 2018-136754). The publication described above discloses a configuration of saving probe information received from a vehicle according to a predetermined collection condition in a storage unit, deleting the probe information which has become unnecessary after distribution of service information to the vehicle based on the probe information to reduce a data maintenance and management cost.

In a vehicle having a connected function of communicating with an external system, various kinds of monitor information acquired in the vehicle are transmitted from the vehicle to the external system. Then, since the monitor information may include personal information of a user of the vehicle, it is needed to confirm the user of acceptance or not of provision of the monitor information to the external system. However, being asked about the acceptance or not of the provision for each monitor information every time is inconvenience for the user. In addition, when specifications of software of the vehicle are updated by OTA (Over The Air) or the like, the monitor information acquired in the vehicle may be added or changed. Therefore, it is difficult to appropriately set the monitor information to be collected from the vehicle according to permission from the user while accurately grasping a kind of the monitor information acquired in the vehicle.

An object of the present application, which has been made in consideration of such a background, is to provide an information collection system and an information collection method which support easy collection from a vehicle of only monitor information permitted by a user of the vehicle from among various kinds of monitor information acquired in the vehicle.

SUMMARY OF THE INVENTION

A first aspect for achieving the object described above is an information collection system including: a vehicle registration information acquisition unit configured to access a vehicle registration database where a user and a vehicle utilized by the user are registered in association with each other for a plurality of users, and acquire user information relating to the user and vehicle information relating to the vehicle; a permitted utilization purpose list acquisition unit configured to, for a target user who is one of the users registered in the vehicle registration database and a target vehicle which is the vehicle associated with the target user recognized from the vehicle information, acquire a permitted utilization purpose list indicating permitted utilization purposes for which the target user permits provision of monitor information acquired in the target vehicle among a plurality of utilization purposes of the monitor information; a monitor information utilization purpose table generation unit configured to generate a monitor information utilization purpose table in which a kind of the monitor information and one of the plurality of utilization purposes are made to correspond, for the two or more kinds of the monitor information acquired in the target vehicle based on specifications of the target vehicle; and a transmission request kind list generation unit configured to extract the kind of the monitor information associated with the permitted utilization purpose as the kind of the monitor information for which transmission is to be requested from the target vehicle based on the permitted utilization purpose list and the monitor information utilization purpose table, and generate a transmission request kind list indicating the extracted kind of the monitor information.

Here, the monitor information includes a status of the target vehicle and a status of the target user in the target vehicle, which are acquired in the target vehicle.

The information collection system described above may be configured such that the vehicle registration information acquisition unit, the permitted utilization purpose list acquisition unit, the monitor information utilization purpose table generation unit and the transmission request kind list generation unit are provided in a computer system which includes a communication control unit configured to communicate with a user terminal used by the user recognized from the user information and the vehicle, the computer system communicating with the vehicle by the communication control unit, the permitted utilization purpose list acquisition unit acquires the permitted utilization purpose list transmitted from a specified user terminal which is the user terminal used by the target user, the permitted utilization purpose list being received by the communication control unit, and a monitor information acquisition unit configured to transmit the transmission request kind list to the target vehicle by the communication control unit is provided in the computer system.

The information collection system described above may be configured such that the vehicle registration information acquisition unit and the monitor information utilization purpose table generation unit are provided in a computer system which includes a communication control unit configured to communicate with the vehicle, the computer system communicating with the vehicle by the communication control unit, the permitted utilization purpose list acquisition unit and the transmission request kind list generation unit are provided in the target vehicle, the transmission request kind list generation unit acquires the monitor information utilization purpose table transmitted from the computer system, the monitor information utilization purpose table being received by the communication control unit, and the permitted utilization purpose list acquisition unit acquires the permitted utilization purpose list by generating the permitted utilization purpose list according to a permitting operation by the target user in the target vehicle.

The information collection system described above may be configured such that the system includes an update recognition unit configured to recognize that update relating to the monitor information is performed for the target vehicle, the monitor information utilization purpose table generation unit updates the monitor information utilization purpose table based on specifications of the target vehicle added or changed by the update when it is recognized by the update recognition unit that the update relating to the monitor information is performed for the target vehicle, and the transmission request kind list generation unit updates the transmission request kind list based on the monitor information utilization purpose table updated by the monitor information utilization purpose table generation unit.

The information collection system described above may be configured such that the monitor information utilization purpose table generation unit manages the monitor information utilization purpose table before the update is performed and the updated monitor information utilization purpose table by attaching version information of the specifications of the vehicle when the monitor information utilization purpose table is generated.

The information collection system described above may be configured such that the monitor information acquisition unit transmits transmission acceptance-or-not inquiry information inquiring acceptance or not of transmission of the monitor information of the kind relating to personal information of the target user to the specified user terminal by the communication control unit, when the kind of the monitor information relating to the personal information of the target user is included in the kinds of the monitor information indicated by the transmission request kind list.

The information collection system described above may be configured such that the system includes a user identification unit configured to identify the target user riding in the target vehicle, and the monitor information acquisition unit does not retransmit the transmission request kind list for the target user identified by the user identification unit to the target vehicle when the transmission request kind list for the target user identified by the user identification unit has been already transmitted to the target vehicle, and transmits the transmission request kind list for the target user identified by the user identification unit to the target vehicle when the transmission request kind list for the target user has not been transmitted to the target vehicle.

A second aspect for achieving the object described above is an information collection method executed by a computer, and the information collection method includes: a vehicle registration information acquisition step of accessing a vehicle registration database where a user and a vehicle utilized by the user are registered in association with each other for a plurality of users, and acquiring user information relating to the user and vehicle information relating to the vehicle; a permitted utilization purpose list acquisition step of, for a target user who is one of the users registered in the vehicle registration database and a target vehicle which is the vehicle associated with the target user recognized from the vehicle information, acquiring a permitted utilization purpose list indicating permitted utilization purposes for which the target user permits provision of monitor information acquired in the target vehicle among a plurality of utilization purposes of the monitor information; a monitor information utilization purpose table generation step of generating a monitor information utilization purpose table in which a kind of the monitor information and one of the plurality of utilization purposes are made to correspond, for the two or more kinds of the monitor information acquired in the target vehicle based on specifications of the target vehicle; and a transmission request kind list generation step of extracting the kind of the monitor information associated with the permitted utilization purpose as the kind of the monitor information for which transmission is to be requested from the target vehicle based on the permitted utilization purpose list and the monitor information utilization purpose table, and generating a transmission request kind list indicating the extracted kind of the monitor information.

According to the information collection system described above, it is possible to support easy collection from a vehicle of only monitor information permitted by a user of the vehicle from among various kinds of the monitor information acquired in the vehicle.

BRIEF DESCRIPTION OF THE DRAWINGS

FIG. 2 is an explanatory drawing of a vehicle registration database;

FIG. 3 is an explanatory drawing of a permitted utilization purpose list, a monitor information utilization purpose table and a transmission request kind list;

DETAILED DESCRIPTION OF THE PREFERRED EMBODIMENTS

Figure 1:
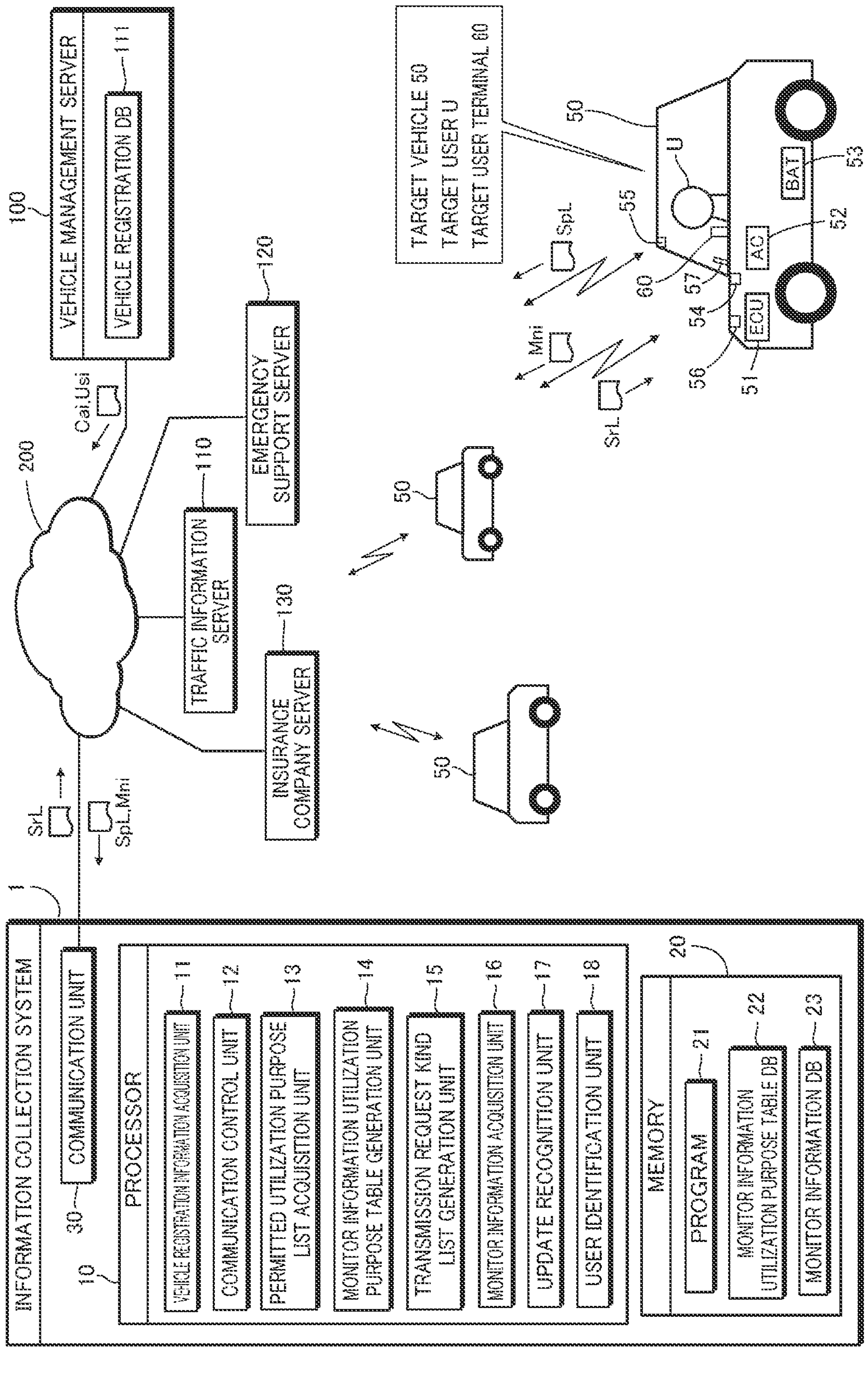
FIG. 1 is an explanatory drawing of a configuration of an information collection system and an aspect of information collection from vehicles by the information collection system.

1. Aspect of Information Collection from Vehicles by Information Collection System With reference to FIG. 1-FIG. 3, the aspect of information collection from a plurality of vehicles 50, which is executed by an information collection system 1 of the present embodiment, will be explained. The information collection system 1 communicates with the plurality of vehicles 50, a user terminal 60 used by a user U of the vehicle 50, a traffic information server 110, an emergency support server 120 and an insurance company server 130 via a communication network 200. The user terminal 60 is a smartphone, a portable phone and a tablet terminal or the like.

A vehicle management server 100 includes a vehicle registration DB (database) 111 where each vehicle 50 and the user U are registered. As illustrated in FIG. 2, in the vehicle registration DB 111, vehicle registration information Cri including a vehicle code (Cc-001, Cc-002, . . . ), a vehicle model/model year (Md-001, Md-002, . . . ), user information (Ui-001, Ui-002, . . . ) and vehicle maintenance information (Cm-001, Cm-002, . . . ) is recorded for each vehicle 50. The vehicle registration information Cri includes vehicle information and user information of the present disclosure.

The vehicle code is identification information intrinsically allocated to each vehicle 50. The user information includes a registration ID (identification), a name, an address and contact information (a telephone number and a communication address of a portable terminal or the like) or the like of a user. The vehicle maintenance information includes a history of maintenance such as an automobile inspection, a periodic inspection and repair of the vehicle 50 and update of software used in the vehicle 50 or the like and a total travel distance or the like of the vehicle 50 confirmed at the time of the maintenance.

The vehicle 50 includes an ECU (Electronic Control Unit) 51 which controls an operation of the vehicle 50, an air conditioner 52, a battery 53, various kinds of sensors 54, a camera 55 which photographs surroundings of the vehicle 50, a communication unit 56 and a display device 57 such as a touch panel. The sensors 54 include a GNSS (Global Navigation Satellite System) sensor which detects the current position of the vehicle 50, a speed sensor, an acceleration sensor, an outside air temperature sensor, an indoor temperature sensor, a battery sensor and a passenger sensor which detects a status of the user U (such as a vehicle interior camera and a biosensor) or the like. The battery sensor detects a voltage, a current and a temperature of the battery 53.

The ECU 51 communicates with the information collection system 1 and the vehicle management server 100 via the communication network 200 by the communication unit 56. In addition, the information collection system 1 and the vehicle management server 100 communicate with the user terminal 60 used by the user U riding in the vehicle 50 via the communication network 200.

The information collection system 1 generates a monitor information utilization purpose table MuT in which kinds of monitor information of the vehicle 50 detected by the sensors 54 of the vehicle 50 and utilization purposes of the monitor information are made to correspond based on specifications of the vehicle 50. As illustrated in FIG. 3, in the monitor information utilization purpose table MuT, functions of the vehicle 50 associated with the utilization purposes and the monitor information indicating a status of each function are associated with each utilization purpose (a service to be a target of utilization) of the monitor information.

The monitor information includes a use status (such as ignition ON/OFF, a current position, a travel speed, acceleration and use of a drive assisting function) including a travel status of the vehicle 50 and a status (such as a photographed image of the vehicle interior camera and a detection value of a heart rate by the biosensor) of the user U.

In an example in FIG. 3, a remote control service, a traffic information service, a driver feedback service, a security service and a Wi-Fi® Spot service are set as the utilization purposes of the monitor information, and a function ID which is identification information of each function and a monitor information ID which is identification information indicating the kind of each monitor information are made to correspond.

The monitor information made to correspond to the utilization purpose of the traffic information service is, for example, the current position, travel speed, advancing direction and acceleration of the vehicle 50 detected in a predetermined cycle (such as 3 seconds). In addition, the monitor information made to correspond to the utilization purpose of the remote control service is, for example, the current position, total travel distance, drivable distance, window and door opening/closing status, lock status, tire inflation pressure, alarm lamp lighting status of the vehicle 50 when a remote operation (such as an operation of the air conditioner 52, notification of a lock being forgotten, a locking operation and a position search of the vehicle 50) of the vehicle 50 by the user terminal 60 is performed.

Hereinafter, the vehicle 50 to be a collection target of the monitor information among the vehicles 50 registered in the vehicle registration DB 111 is called a target vehicle 50, the user U registered in the vehicle registration DB 111 in association with the target vehicle 50 is called a target user U, and the user terminal 60 used by the target user U is called a target user terminal 60 to give explanation.

The target user U operates a utilization application of the vehicle 50 executed in the target user terminal 60 and specifies the monitor information permitted to be provided from among pieces of the monitor information acquired in the vehicle 50 for each utilization purpose of the monitor information. According to the operation, a permitted utilization purpose list SpL generated by the utilization application is transmitted from the target user terminal 60 to the information collection system 1.

As illustrated in FIG. 3, the permitted utilization purpose list SpL indicates whether or not each utilization purpose of the monitor information is permitted by the target user U. The permitted utilization purpose list SpL in FIG. 3 indicates the utilization purpose permitted to be provided by the target user U by "ON" and indicates the utilization purpose denied being provided by the target user U by "OFF".

The information collection system 1 generates a transmission request kind list SrL by extracting monitor information IDs made to correspond to the utilization purposes permitted by the permitted utilization purpose list SpL from the monitor information utilization purpose table MuT, as illustrated in FIG. 3.

The information collection system 1 transmits the generated transmission request kind list SrL to the target vehicle 50, and the target vehicle 50 transmits monitor information Mni to which the monitor information ID indicated in the transmission request kind list SrL is attached to the information collection system 1. The information collection system 1 transmits the monitor information Mni received and acquired from the vehicle 50 to a provision destination of the utilization purpose made to correspond by the monitor information utilization purpose table MuT. For example, the information collection system 1 transmits the monitor information Mni made to correspond to the utilization purpose of the traffic information service to the traffic information server 110.

In such a manner, according to the information collection system 1, after the target user U performs an operation of specifying acceptance or not of provision of the monitor information once for each utilization purpose when, for example, starting utilization of the target vehicle 50, the operation of permitting the provision of the monitor information is no longer needed. In addition, though details are to be described later, since the provision of the monitor information is permitted for the utilization purpose, even when the monitor information is changed or added by update of the target vehicle 50, the user U does not need a new permitting operation. Thus, convenience of the user U can be improved and processing for the update of the target vehicle 50 in the information collection system 1 can be reduced.

2. Configuration of Information Collection System

With reference to FIG. 1, the configuration of the information collection system 1 will be explained. The information collection system 1 is a computer system including a processor 10, a memory 20, and a communication unit 30 or the like. The communication unit 30 communicates with the vehicle 50, the user terminal 60, the vehicle management server 100, the traffic information server 110, the emergency support server 120 and the insurance company server 130 or the like via the communication network 200.

In the memory 20, a program 21 for control of the information collection system 1, a monitor information utilization purpose table DB 22 where the monitor information utilization purpose table MuT corresponding to each vehicle 50 registered in the vehicle registration DB 111 is recorded, and a monitor information DB 23 where the monitor information Mni acquired from each vehicle 50 is recorded are saved.

The processor 10 functions as a vehicle registration information acquisition unit 11, a communication control unit 12, a permitted utilization purpose list acquisition unit 13, a monitor information utilization purpose table generation unit 14, a transmission request kind list generation unit 15, a monitor information acquisition unit 16, an update recognition unit 17 and a user identification unit 18, by reading and executing the program 21.

Processing executed by the vehicle registration information acquisition unit 11 corresponds to a vehicle registration information acquisition step in an information collection method of the present disclosure, and processing executed by the communication control unit 12 corresponds to a communication control step in the information collection method of the present disclosure. Processing executed by the permitted utilization purpose list acquisition unit 13 corresponds to a permitted utilization purpose list acquisition step in the information collection method of the present disclosure, and processing executed by the monitor information utilization purpose table generation unit 14 corresponds to a monitor information utilization purpose table generation step in the information collection method of the present disclosure. Processing executed by the transmission request kind list generation unit 15 corresponds to a transmission request kind list generation step in the information collection method of the present disclosure.

The vehicle registration information acquisition unit 11 refers to the vehicle registration DB 111 and acquires user information Usi relating to the target user U and vehicle information Cai relating to the target vehicle 50 by accessing the vehicle management server 100 via the communication network 200 by the communication unit 30. The communication control unit 12 controls communication via the communication network 200 by the communication unit 30 with the target vehicle 50 specified from the vehicle information Cai and the target user terminal 60 specified from the user information Usi.

The permitted utilization purpose list acquisition unit 13 receives and acquires the permitted utilization purpose list SpL (see FIG. 3) transmitted from the target user terminal 60 by the communication unit 30 and the communication control unit 12. The monitor information utilization purpose table generation unit 14 generates the monitor information utilization purpose table MuT (see FIG. 3) corresponding to the target vehicle 50, based on the specifications of the target vehicle 50 recognized from the vehicle information Cai. Note that the specifications of the target vehicle 50 may be recognized by specification information acquired from the target vehicle 50 by the communication with the target vehicle 50, or may be recognized by the specification information acquired from a server by the communication with the server of a maker of the target vehicle 50.

The transmission request kind list generation unit 15 makes the permitted utilization purpose list SpL and the monitor information utilization purpose table MuT correspond to each other as described above with reference to FIG. 3, and generates the transmission request kind list SrL indicating the monitor information ID (the kind of the monitor information Mni) of the monitor information Mni for which transmission is to be requested from the target vehicle 50.

The monitor information acquisition unit 16 transmits the transmission request kind list SrL to the target vehicle 50 via the communication network 200 by the communication control unit 12 and the communication unit 30. Thus, the ECU 51 of the target vehicle 50 can transmit only the monitor information Mni indicated by the transmission request kind list SrL from among the pieces of the monitor information Mni detected by the sensors 54 provided in the vehicle 50 to the information collection system 1.

The update recognition unit 17 recognizes that the software executed in the ECU 51 of the target vehicle 50 is updated by receiving update information transmitted from the target vehicle 50 or the vehicle management server 100 by the communication control unit 12 and the communication unit 30.

When it is recognized by the update recognition unit 17 that the target vehicle 50 is updated, the monitor information utilization purpose table generation unit 14 updates the monitor information utilization purpose table MuT according to the specifications of the target vehicle 50 added or changed by the update. The transmission request kind list generation unit 15 updates the transmission request kind list SrL according to the updated monitor information utilization purpose table MuT. The monitor information acquisition unit 16 transmits the transmission request kind list SrL to the target vehicle 50.

The user identification unit 18 identifies the user U riding in the target vehicle 50. The user identification unit 18 identifies the user U riding in the target vehicle 50 by specifying an owner of the user terminal 60 who has transmitted position information indicating a position same as the current position of the target vehicle 50 to the information collection system 1 from the user information Usi when ignition ON information of the target vehicle 50 is received from the target vehicle 50. Note that the user U riding in the target vehicle 50 may be identified by collating biological information (such as a face image, an iris and a fingerprint) of the user U detected in the target vehicle 50 with biological information recorded in the user information Usi.

When the user U identified by the user identification unit 18 is the same as the user who has previously utilized the target vehicle 50 and the transmission request kind list SrL corresponding to the user has been already transmitted to the vehicle 50, the monitor information acquisition unit 16 does not retransmit the transmission request kind list SrL to the vehicle 50. On the other hand, when the user U identified by the user identification unit 18 is different from the user who has previously utilized the target vehicle 50 and the transmission request kind list SrL corresponding to the user has not been transmitted to the vehicle 50, the monitor information acquisition unit 16 transmits the transmission request kind list SrL corresponding to the user to the target vehicle 50. The processing deals with a case where the target vehicle 50 is a shared vehicle or the like and the target user U frequently changes.

Note that, when the target vehicle 50 is shared among the plurality of users U of a family or the like, the transmission request kind list SrL individually corresponding to each target user constituting the family may be transmitted from the information collection system 1 to the target vehicle 50 and saved in a memory or the like of the ECU 51. In this case, the user identification unit 18 transmits the ID of the identified target user to the target vehicle 50, and the ECU 51 switches the transmission request kind list SrL to be used according to the ID of the target and selects the monitor information Mni to be transmitted to the information collection system 1.

3. Collection Processing of Monitor Information

According to a flowchart illustrated in FIG. 4, a series of procedures of the collection processing of the monitor information Mni from the target vehicle 50, which is executed by the information collection system 1, will be explained.

Figure 4:
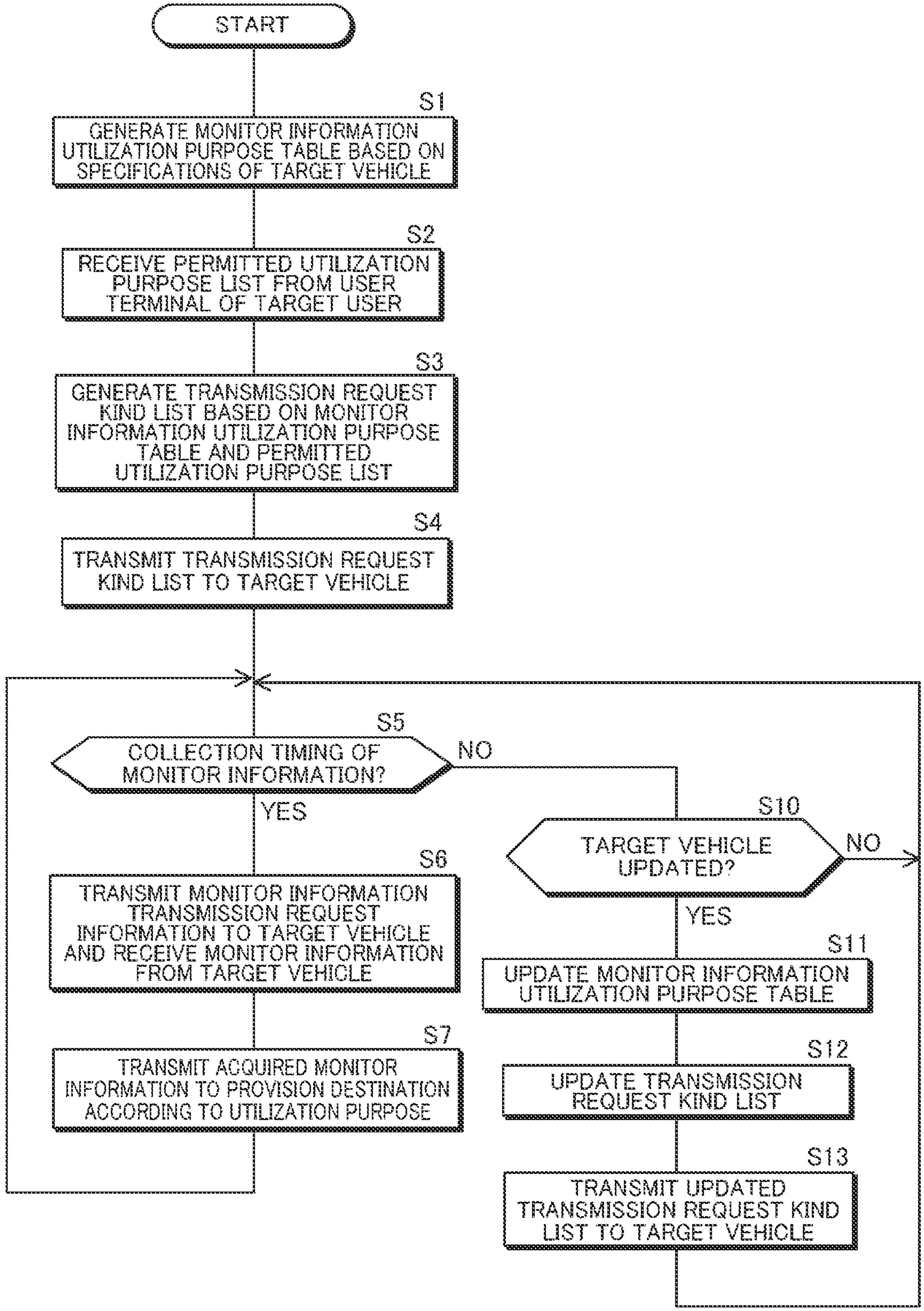
FIG. 4 is a flowchart of collection processing of monitor information.

In step S1 in FIG. 4, the monitor information utilization purpose table generation unit 14 generates the monitor information utilization purpose table MuT (see FIG. 3) corresponding to the target vehicle 50 based on the specifications of the target vehicle 50. In following step S2, the permitted utilization purpose list acquisition unit 13 receives and acquires the permitted utilization purpose list SpL (see FIG. 3) from the target user terminal 60.

In next step S3, the transmission request kind list generation unit 15 applies the permitted utilization purpose list SpL of the target user U to the monitor information utilization purpose table MuT of the target vehicle 50 and generates the transmission request kind list SrL (see FIG. 3). In following step S4, the monitor information acquisition unit 16 transmits the transmission request kind list SrL to the target vehicle 50. Thus, in the target vehicle 50 which receives the transmission request kind list SrL, only the monitor information Mni to which the monitor information ID indicated by the transmission request kind list SrL is attached from among various kinds of the monitor information Mni detected by the sensors 54 can be transmitted to the information collection system 1.

By a loop of next step S5 and step S10, the monitor information acquisition unit 16 advances the processing to step S6 when a collection timing of the monitor information Mni comes in step S5. The collection timing of the monitor information Mni is set at the point of time when the information collection system 1 receives the ignition ON information transmitted from the target vehicle 50, for example.

In step S6, the monitor information acquisition unit 16 transmits monitor information transmission request information requesting the transmission of the monitor information Mni from the target vehicle 50, and receives and acquires the monitor information Mni to which the monitor information ID selected by the transmission request kind list SrL is attached and which is transmitted from the target vehicle 50. In next step S7, the monitor information acquisition unit 16 transmits the acquired monitor information Mni to the provision destination according to the utilization purpose which is made to correspond by the monitor information utilization purpose table MuT.

For example, the monitor information acquisition unit 16 transmits the monitor information Mni whose corresponding utilization purpose is the traffic information service to the traffic information server 110. In addition, the monitor information acquisition unit 16 transmits the monitor information Mni whose corresponding utilization purpose is the driver feedback service to the insurance company server 130. Further, the monitor information acquisition unit 16 transmits the monitor information Mni whose corresponding utilization purpose is the security service to the emergency support server 120. Then, the monitor information acquisition unit 16 advances the processing to step S5.

When it is recognized that the target vehicle 50 is updated in step S10, the update recognition unit 17 advances the processing to step S11. In step S11, the monitor information utilization purpose table generation unit 14 updates the monitor information utilization purpose table MuT corresponding to the target vehicle 50 according to the updated specifications of the target vehicle 50. In following step S12, the transmission request kind list generation unit 15 applies the permitted utilization purpose list SpL of the target user U to the updated monitor information utilization purpose table MuT and updates the transmission request kind list SrL.

In next step S13, the monitor information acquisition unit 16 transmits the updated transmission request kind list SrL to the target vehicle 50. Thus, in the target vehicle 50, the monitor information Mni to which the monitor information ID identified by the transmission request kind list SrL updated according to the updated specifications of the target vehicle 50 is attached can be selected and transmitted to the information collection system 1. Then, the monitor information acquisition unit 16 advances the processing to step S5.

4. Acquisition Processing of Permitted Utilization Purpose List According to User Change According to a flowchart illustrated in FIG. 5, a series of processing for the acquisition processing of the permitted utilization purpose list SpL according to user change, which is executed by the information collection system 1, will be explained.

Figure 5:
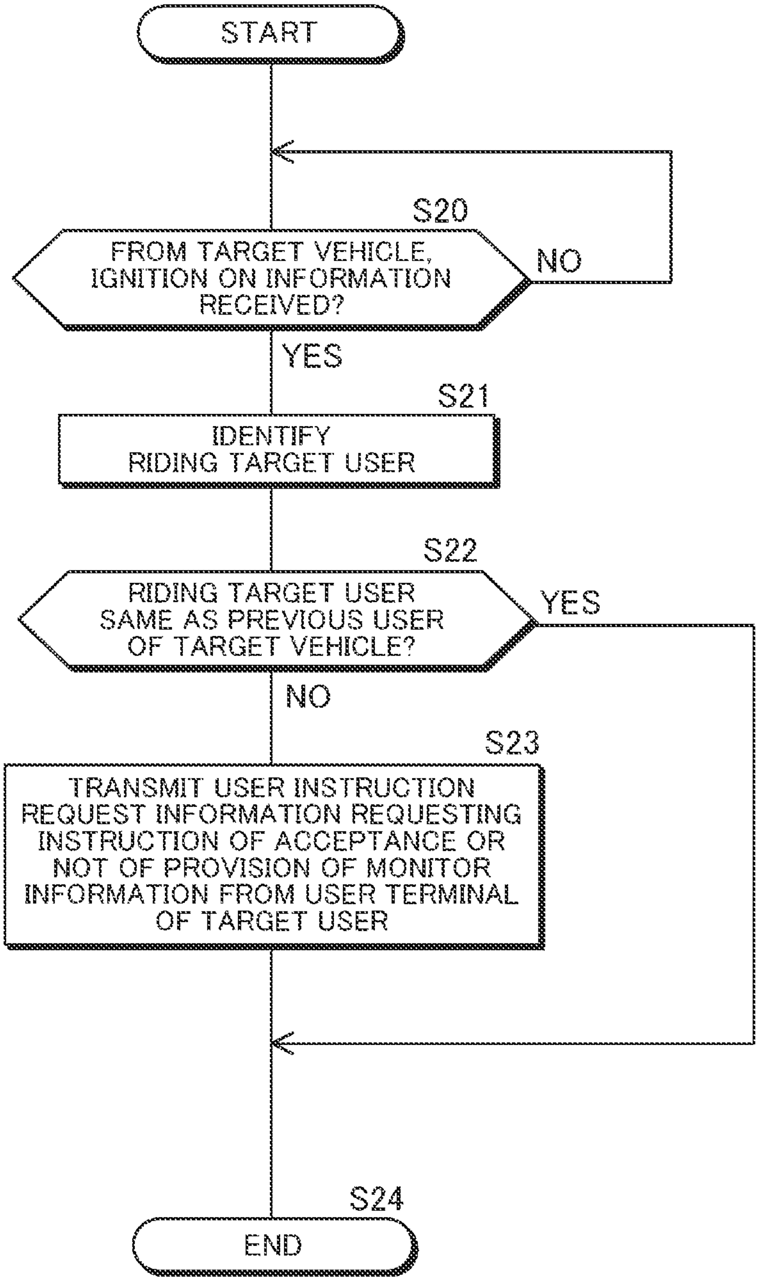
FIG. 5 is a flowchart of acquisition processing of the permitted utilization purpose list according to user change.

In step S20 in FIG. 5, when the ignition ON information is received from the target vehicle 50, the user identification unit 18 advances the processing to step S21. In step S21, the user identification unit 18 identifies the target user U riding in the target vehicle 50. In following step S22, the permitted utilization purpose list acquisition unit 13 determines whether or not the target user U identified by the user identification unit 18 is the same as the user who has previously used the target vehicle 50.

Then, the permitted utilization purpose list acquisition unit 13 advances the processing to step S24 when the target user U identified by the user identification unit 18 is the same as the user who has previously used the target vehicle 50, and advances the processing to step S23 when the target user U is not the same. In step S23, the permitted utilization purpose list acquisition unit 13 transmits user instruction request information requesting an instruction of the acceptance or not of the provision of the monitor information from the user terminal 60 used by the target user U.

Thus, by the utilization application of the target vehicle 50 executed in the user terminal 60, a screen which specifies the acceptance or not of the provision of the monitor information Mni for each utilization purpose of the monitor information Mni is displayed, and the permitted utilization purpose list SpL is generated according to a specifying operation by the target user U. Then, the permitted utilization purpose list SpL is transmitted from the target vehicle 50 to the information collection system 1, and by the above-described processing according to the flowchart illustrated in FIG. 4, the transmission request kind list SrL for the new target user U is generated and transmitted to the vehicle 50.

Thus, even in the case where the user U frequently changes, such as the case where the target vehicle 50 is a shared vehicle, by receiving the permitted utilization purpose list SpL from the user terminal 60 and executing the processing illustrated in FIG. 4, the transmission request kind list SrL corresponding to the new target user U can be generated and transmitted to the target vehicle 50.

5. Other Embodiments

In the embodiment described above, the user identification unit 18 is provided and the user riding in the target vehicle 50 is identified, however, the user identification unit 18 may be omitted. In this case, since the target user is normally different from the previous user when the target vehicle 50 is a shared vehicle, when it is recognized that the target user gets on the target vehicle 50, the screen for instructing the acceptance or not of the provision of the monitor information Mni for each utilization purpose may be displayed at a display unit of the user terminal 60 of the user U or on the touch panel 57 of the target vehicle 50, the permitted utilization purpose list SpL may be generated in the target user terminal 60 or the target vehicle 50 and the permitted utilization purpose list SpL may be transmitted from the target user terminal 60 or the target vehicle 50 to the information collection system 1.

In the embodiment described above, the target user U operates the application of the user terminal 60 and transmits the permitted utilization purpose list SpL to the information collection system 1. As another embodiment, the target user U may operate the touch panel 57 of the target vehicle 50 and transmit the permitted utilization purpose list SpL to the information collection system 1. In this case, the user terminal used by the user of the present disclosure is composed of the touch panel 57, the communication unit 56 and a communication control function of the ECU 51.

In the embodiment described above, the acceptance or not of the provision may be confirmed for the monitor information Mni relating to personal information of the target user U even when it is the monitor information Mni to which the monitor information ID belonging to the utilization purpose permitted by the permitted utilization purpose list SpL is attached. In this case, the monitor information acquisition unit 16 transmits information inquiring the acceptance or not of the provision of the target monitor information Mni to the user terminal 60 or the target vehicle 50 and displays a confirmation screen at the display unit of the user terminal 60 or on the touch panel 57 of the target vehicle 50. Then, only when information permitting the provision is received from the user terminal 60 or the target vehicle 50, the monitor information Mni relating to the personal information is transmitted from the target vehicle 50.

The embodiment described above illustrates an example that the vehicle registration DB 111 is provided in the vehicle management server 100, however, the vehicle registration DB 111 may be provided in the memory 20 of the information collection system 1.

In the embodiment described above, the information collection system 1 is composed of the computer system which communicates with the vehicle 50 via the communication network 200, however, the information collection system of the present disclosure may be composed of the ECU 51 loaded in the vehicle 50. In this case, the vehicle 50 receives and acquires the permitted utilization purpose list SpL transmitted from the user terminal 60.

In addition, some of the configuration of the information collection system 1 may be provided in the vehicle 50. For example, the vehicle registration information acquisition unit 11 and the monitor information utilization purpose table generation unit 14 may be provided in the information collection system 1 (computer system), and the permitted utilization purpose list acquisition unit 13 and the transmission request kind list generation unit 15 may be provided in the vehicle 50. In this case, the monitor information utilization purpose table MuT generated by the monitor information utilization purpose table generation unit 14 is transmitted from the computer system to the vehicle 50. Further, the permitted utilization purpose list acquisition unit 13 generates the permitted utilization purpose list SpL according to the permitting operation of the user U to a permission instruction screen for the utilization purpose of the monitor information Mni, which is displayed on the touch panel 57 provided in the vehicle 50. Then, the transmission request kind list generation unit 15 generates the transmission request kind list SrL based on the monitor information utilization purpose table MuT and the permitted utilization purpose list SpL. The user U can change setting of permission of the utilization purpose of the monitor information Mni at all times by operating the display device 57, and according to the change, the permitted utilization purpose list acquisition unit 13 updates the permitted utilization purpose list SpL and the transmission request kind list generation unit 15 updates the transmission request kind list SrL.

Note that FIG. 1 is a schematic drawing in which a functional configuration of the information collection system 1 is segmented according to main processing contents and illustrated in order to facilitate understanding of the invention of the present disclosure, and the configuration of the information collection system 1 may be made with other segmentations. In addition, the processing of each component may be executed by one hardware unit or may be executed by a plurality of hardware units. Further, the processing of each component illustrated in FIG. 4 and FIG. 5 may be executed by one program or may be executed by a plurality of programs.

6. Configurations Supported by Embodiment Described Above

The embodiment described above is a specific example of the following configurations.

(Configuration 1) An information collection system including: a vehicle registration information acquisition unit configured to access a vehicle registration database where a user and a vehicle utilized by the user are registered in association with each other for a plurality of users, and acquire user information relating to the user and vehicle information relating to the vehicle; a permitted utilization purpose list acquisition unit configured to, for a target user who is one of the users registered in the vehicle registration database and a target vehicle which is the vehicle associated with the target user recognized from the vehicle information, acquire a permitted utilization purpose list indicating permitted utilization purposes for which the target user permits provision of monitor information acquired in the target vehicle among a plurality of utilization purposes of the monitor information; a monitor information utilization purpose table generation unit configured to generate a monitor information utilization purpose table in which a kind of the monitor information and one of the plurality of utilization purposes are made to correspond, for the two or more kinds of the monitor information acquired in the target vehicle based on specifications of the target vehicle; and a transmission request kind list generation unit configured to extract the kind of the monitor information associated with the permitted utilization purpose as the kind of the monitor information for which transmission is to be requested from the target vehicle based on the permitted utilization purpose list and the monitor information utilization purpose table, and generate a transmission request kind list indicating the extracted kind of the monitor information.

According to the information collection system of configuration 1, it is possible to support easy collection from the vehicle of only the monitor information permitted by the user of the vehicle from among various kinds of the monitor information acquired in the vehicle.

(Configuration 2) The information collection system according to configuration 1, wherein the vehicle registration information acquisition unit, the permitted utilization purpose list acquisition unit, the monitor information utilization purpose table generation unit and the transmission request kind list generation unit are provided in a computer system which includes a communication control unit configured to communicate with a user terminal used by the user recognized from the user information and the vehicle, the computer system communicating with the vehicle by the communication control unit, the permitted utilization purpose list acquisition unit acquires the permitted utilization purpose list transmitted from a specified user terminal which is the user terminal used by the target user, the permitted utilization purpose list being received by the communication control unit, and a monitor information acquisition unit configured to transmit the transmission request kind list to the target vehicle by the communication control unit is provided in the computer system.

According to the information collection system of configuration 2, by generating the transmission request kind list by the computer system, loads of the processing for collecting the monitor information in the target vehicle can be reduced.

(Configuration 3) The information collection system according to configuration 1, wherein the vehicle registration information acquisition unit and the monitor information utilization purpose table generation unit are provided in a computer system which includes a communication control unit configured to communicate with the vehicle, the computer system communicating with the vehicle by the communication control unit, the permitted utilization purpose list acquisition unit and the transmission request kind list generation unit are provided in the target vehicle, the transmission request kind list generation unit acquires the monitor information utilization purpose table transmitted from the computer system, the monitor information utilization purpose table being received by the communication control unit, and the permitted utilization purpose list acquisition unit acquires the permitted utilization purpose list by generating the permitted utilization purpose list according to a permitting operation by the target user in the target vehicle.

According to the information collection system of configuration 3, by generating the transmission request kind list by the target vehicle, the loads of communication processing between the computer system and the target vehicle can be reduced.

(Configuration 4) The information collection system according to configuration 1, including an update recognition unit configured to recognize that update relating to the monitor information is performed for the target vehicle, wherein the monitor information utilization purpose table generation unit updates the monitor information utilization purpose table based on specifications of the target vehicle added or changed by the update when it is recognized by the update recognition unit that the update relating to the monitor information is performed for the target vehicle, and the transmission request kind list generation unit updates the transmission request kind list based on the monitor information utilization purpose table updated by the monitor information utilization purpose table generation unit.

According to the information collection system of configuration 4, it is not needed to acquire the permitted utilization purpose list again when the target vehicle is updated, and by updating the monitor information utilization purpose table and the transmission request kind list, the kind of the monitor information to be collected from the target vehicle can be reset according to the added or changed specifications of the target vehicle.

(Configuration 5) The information collection system according to configuration 4, wherein the monitor information utilization purpose table generation unit manages the monitor information utilization purpose table before the update is performed and the updated monitor information utilization purpose table by attaching version information of the specifications of the vehicle when the monitor information utilization purpose table is generated.

According to the information collection system of configuration 5, the monitor information utilization purpose table corresponding to each update can be easily managed by means of the version information.

(Configuration 6) The information collection system according to configuration 2, wherein the monitor information acquisition unit transmits transmission acceptance-or-not inquiry information inquiring acceptance or not of transmission of the monitor information of the kind relating to personal information of the target user to the specified user terminal by the communication control unit, when the kind of the monitor information relating to the personal information of the target user is included in the kinds of the monitor information indicated by the transmission request kind list.

According to the information collection system of configuration 6, the monitor information relating to the personal information of the target user can be prevented from being transmitted from the target vehicle without the permission from the target user.

(Configuration 7) The information collection system according to configuration 2, including a user identification unit configured to identify the target user riding in the target vehicle, wherein the monitor information acquisition unit does not retransmit the transmission request kind list for the target user identified by the user identification unit to the target vehicle when the transmission request kind list for the target user identified by the user identification unit has been already transmitted to the target vehicle, and transmits the transmission request kind list for the target user identified by the user identification unit to the target vehicle when the transmission request kind list for the target user has not been transmitted to the target vehicle.

According to the information collection system of configuration 7, by not retransmitting the transmission request kind list for the target user for whom the transmission request kind list has been transmitted to the target vehicle, the loads of the communication processing between the target vehicle and the information collection system can be reduced.

(Configuration 8) An information collection method executed by a computer, the information collection method including: a vehicle registration information acquisition step of accessing a vehicle registration database where a user and a vehicle utilized by the user are registered in association with each other for a plurality of users, and acquiring user information relating to the user and vehicle information relating to the vehicle; a permitted utilization purpose list acquisition step of, for a target user who is one of the users registered in the vehicle registration database and a target vehicle which is the vehicle associated with the target user recognized from the vehicle information, acquiring a permitted utilization purpose list indicating permitted utilization purposes for which the target user permits provision of monitor information acquired in the target vehicle among a plurality of utilization purposes of the monitor information; a monitor information utilization purpose table generation step of generating a monitor information utilization purpose table in which a kind of the monitor information and one of the plurality of utilization purposes are made to correspond, for the two or more kinds of the monitor information acquired in the target vehicle based on specifications of the target vehicle; and a transmission request kind list generation step of extracting the kind of the monitor information associated with the permitted utilization purpose as the kind of the monitor information for which transmission is to be requested from the target vehicle based on the permitted utilization purpose list and the monitor information utilization purpose table, and generating a transmission request kind list indicating the extracted kind of the monitor information.

By executing the information collection method of configuration 8 by the computer, effects similar to that of the information collection system of configuration 1 can be obtained.

REFERENCE SIGNS LIST

1 . . . information collection system, 10 . . . processor, 11 . . . vehicle registration information acquisition unit, 12 . . . communication control unit, 13 . . . permitted utilization purpose list acquisition unit, 14 . . . monitor information utilization purpose table generation unit, 15 . . . transmission request kind list generation unit, 16 . . . monitor information acquisition unit, 17 . . . update recognition unit, 18 . . . user identification unit, 20 . . . memory, 21 . . . program, 22 . . . monitor information utilization purpose table DB, 23 . . . monitor information DB, 30 . . . communication unit, 50 . . . vehicle, 51 . . . ECU, 52 . . . air conditioner, 53 . . . battery, 54 . . . sensors, 55 . . . camera, 56 . . . communication unit, 57 . . . display device, 60 . . . user terminal, 100 . . . vehicle management server, 111 . . . vehicle registration DB, 110 . . . traffic information server, 120 . . . emergency support server, 130 . . . insurance company server, 200 . . . communication network, U . . . user.

What is claimed is:

1. An information collection system comprising a processor that functions as:

a vehicle registration information acquisition unit configured to access a vehicle registration database where a user and a vehicle utilized by the user are registered in association with each other for a plurality of users, and acquire user information relating to the user and vehicle information relating to the vehicle;

a permitted utilization purpose list acquisition unit configured to, for a target user who is one of the users registered in the vehicle registration database and a target vehicle which is the vehicle associated with the target user recognized from the vehicle information, acquire a permitted utilization purpose list indicating a permitted utilization purpose for which the target user permits provision of monitor information acquired in the target vehicle among a plurality of utilization purposes of the monitor information;

a monitor information utilization purpose table generation unit configured to generate a monitor information utilization purpose table in which a kind of the monitor information and one of the plurality of utilization purposes are made to correspond, for the two or more kinds of the monitor information acquired in the target vehicle based on specifications of the target vehicle;

a transmission request kind list generation unit configured to extract the kind of the monitor information associated with the permitted utilization purpose as the kind of the monitor information for which transmission is to be requested from the target vehicle based on the permitted utilization purpose list and the monitor information utilization purpose table, and generate a transmission request kind list indicating the extracted kind of the monitor information; and an update recognition unit configured to recognize that software executed in an ECU (Electronic Control Unit) of the target vehicle is updated, wherein the information collection system communicates with the target vehicle via a communication network, the information collection system displays a screen for instructing acceptance or not of the provision of the monitor information for each utilization purpose at a terminal display of a user terminal used by the target user or on a vehicle display of the target vehicle, the permitted utilization purpose list is generated according to a permitting operation of the target user to the screen, the monitor information utilization purpose table generation unit updates the monitor information utilization purpose table based on the specifications of the target vehicle added or changed by the update when it is recognized by the update recognition unit that the software executed in the ECU of the target vehicle is updated, and the transmission request kind list generation unit updates the transmission request kind list based on the monitor information utilization purpose table updated by the monitor information utilization purpose table generation unit.

2. The information collection system according to claim 1, wherein the processor that functions as the vehicle registration information acquisition unit, the permitted utilization purpose list acquisition unit, the monitor information utilization purpose table generation unit and the transmission request kind list generation unit is provided in a computer system which communicates with a user terminal used by the user recognized from the user information and the vehicle, the permitted utilization purpose list acquisition unit acquires the permitted utilization purpose list transmitted from a specified user terminal which is the user terminal used by the target user, the permitted utilization purpose list being received by a communication control unit, and the processor that is provided in the computer system functions as a monitor information acquisition unit configured to transmit the transmission request kind list to the target vehicle by the communication control unit.

3. The information collection system according to claim 2, wherein the monitor information acquisition unit transmits transmission acceptance-or-not inquiry information inquiring acceptance or not of transmission of the monitor information of the kind relating to personal information of the target user to the specified user terminal by the communication control unit, when the kind of the monitor information relating to the personal information of the target user is included in the kinds of the monitor information indicated by the transmission request kind list.

4. The information collection system according to claim 2, wherein the processor functions as a user identification unit configured to identify the target user riding in the target vehicle, the monitor information acquisition unit does not retransmit the transmission request kind list for the target user identified by the user identification unit to the target vehicle when the transmission request kind list for the target user identified by the user identification unit has been already transmitted to the target vehicle, and transmits the transmission request kind list for the target user identified by the user identification unit to the target vehicle when the transmission request kind list for the target user has not been transmitted to the target vehicle.

5. The information collection system according to claim 1, wherein the processor comprises a system processor and a vehicle processor, the system processor functions as the vehicle registration information acquisition unit and the monitor information utilization purpose table generation unit and is provided in a computer system which communicates with the vehicle, the vehicle processor functions as the permitted utilization purpose list acquisition unit and the transmission request kind list generation unit and is provided in the target vehicle, the transmission request kind list generation unit acquires the monitor information utilization purpose table transmitted from the computer system, the monitor information utilization purpose table being received by a communication control unit, and the permitted utilization purpose list acquisition unit acquires the permitted utilization purpose list by generating a permitted utilization purpose list according to a permitting operation by the target user in the target vehicle.

6. The information collection system according to claim 1, wherein the monitor information utilization purpose table generation unit manages the monitor information utilization purpose table before the update is performed and the updated monitor information utilization purpose table by attaching version information of the specifications of the target vehicle when the monitor information utilization purpose table is generated.

7. An information collection method executed by a computer, the information collection method comprising:

a vehicle registration information acquisition step of accessing a vehicle registration database where a user and a vehicle utilized by the user are registered in association with each other for a plurality of users, and acquiring user information relating to the user and vehicle information relating to the vehicle;

a permitted utilization purpose list acquisition step of, for a target user who is one of the users registered in the vehicle registration database and a target vehicle which is the vehicle associated with the target user recognized from the vehicle information, acquiring a permitted utilization purpose list indicating a permitted utilization purpose for which the target user permits provision of monitor information acquired in the target vehicle among a plurality of utilization purposes of the monitor information;

a monitor information utilization purpose table generation step of generating a monitor information utilization purpose table in which a kind of the monitor information and one of the plurality of utilization purposes are made to correspond, for the two or more kinds of the monitor information acquired in the target vehicle based on specifications of the target vehicle;

a transmission request kind list generation step of extracting the kind of the monitor information associated with the permitted utilization purpose as the kind of the monitor information for which transmission is to be requested from the target vehicle based on the permitted utilization purpose list and the monitor information utilization purpose table, and generating a transmission request kind list indicating the extracted kind of the monitor information; and an update recognition step of recognizing that software executed in an ECU (Electronic Control Unit) of the target vehicle is updated, wherein the computer communicates with the target vehicle via a communication network, the information collection system displays a screen for instructing acceptance or not of the provision of the monitor information for each utilization purpose at a terminal display of a user terminal used by the target user or on a vehicle display of the target vehicle, the permitted utilization purpose list is generated according to a permitting operation of the target user to the screen, the monitor information utilization purpose table generation step updates the monitor information utilization purpose table based on the specifications of the target vehicle added or changed by the update when it is recognized in the update recognition step that the software executed in the ECU of the target vehicle is updated, and the transmission request kind list generation step updates the transmission request kind list based on the monitor information utilization purpose table updated in the monitor information utilization purpose table generation step.

* * * * *